(12) United States Patent
Lin

(10) Patent No.: US 6,510,354 B1
(45) Date of Patent: Jan. 21, 2003

(54) UNIVERSAL ROBUST FILTERING PROCESS

(76) Inventor: Ching-Fang Lin, 9131 Mason Ave., Chatsworth, CA (US) 91311

( * ) Notice: Subject to any disclaimer, the term of this patent is extended or adjusted under 35 U.S.C. 154(b) by 0 days.

(21) Appl. No.: 09/551,897

(22) Filed: Apr. 19, 2000

Related U.S. Application Data

(60) Provisional application No. 60/130,372, filed on Apr. 21, 1999.

(51) Int. Cl.[7] .............................................. G05B 13/02
(52) U.S. Cl. ............................... 700/55; 700/2; 700/50; 700/52; 700/53; 700/44; 706/900; 708/300; 708/303
(58) Field of Search ............................... 700/2, 50, 52, 700/53, 44, 55, 305; 701/3, 13, 213–214, 226, 200, 208, 207; 706/900; 708/300, 303

(56) References Cited

U.S. PATENT DOCUMENTS

| | | | | | |
|---|---|---|---|---|---|
| 5,398,303 | A | * | 3/1995 | Tanaka | 706/45 |
| 5,408,424 | A | * | 4/1995 | Lo | 706/22 |
| 5,539,642 | A | * | 7/1996 | Wiel | 244/110 R |
| 5,790,412 | A | * | 8/1998 | Su | 702/78 |
| 6,236,365 | B1 | * | 5/2001 | LeBlanc et al. | 342/450 |
| 6,285,971 | B1 | * | 9/2001 | Shah et al. | 700/38 |
| 6,292,758 | B1 | * | 9/2001 | Gilbert et al. | 342/450 |
| 6,337,657 | B1 | * | 1/2002 | Zhodzishsky et al. | 342/357.02 |

OTHER PUBLICATIONS

US 2002/0032490 A1, Mar. 14, 2002, Lin, Filtering Process for Stable and Accurate Estamation.*

* cited by examiner

*Primary Examiner*—Ramesh Patel
(74) *Attorney, Agent, or Firm*—Raymond Y. Chan; David and Raymond Patent Group

(57) ABSTRACT

A universal robust filtering process is adapted for eliminating the need of prediscretizing a continuous-time differential model into a discrete-time difference model. It provides a universal robust solution to the most general formulation, in the sense that the system dynamics are described by nonlinear continuous-time differential equations, and the nonlinear measurements are taken at intermittent discrete times randomly spaced. The universal robust filtering process includes the procedures of validating the measurement using fuzzy logic, and incorporating factorized forward filtering and backward smoothing to guarantee numerical stability. It provides users a reliable and convenient solution to extracting internal dynamic system state estimates from noisy measurements, with wider applications, better accuracy, better stability, easier design, and easier implementation.

28 Claims, 6 Drawing Sheets

UNIVERSAL ROBUST FILTERING PROCESS

CROSS REFERENCE OF RELATED APPLICATION

This is a regular application of a provisional application having an application No. of 60/130,372 and a filing date of Apr. 21, 1999.

FIELD OF THE PRESENT INVENTION

The present invention relates to robust information extraction, and more particularly to a universal robust filtering process for extracting internal state information of a dynamic system from noisy measurements.

BACKGROUND OF THE PRESENT INVENTION

In most information extraction applications, propagation of an internal state of a dynamic system, which is not measurable by sensors directly, is naturally described by nonlinear continuous-time differential equations, based upon physical laws, $$\dot{x}(t)=f(x(t))+w(t)$$

where $x(t)$ is a state vector, $f(x)$ is a vector nonlinear function describing the system dynamics, and $w(t)$ is a system noise with a covariance matrix $Q(t)$.

Measurable quantities, which are generally available at intermittent discrete times, are usually in nonlinear relationship with the internal system states, $$z(k)=h(x(k))+v(k)$$

where $z(k)$ represents a discrete measurement at the k-th sampling time $t_k$, $h(x)$ is a vector nonlinear function which describes the relationship of the measurement with the state vector, and $v(k)$ is a measurement noise with a covariance of $R(k)$.

A filtering process deals with the problem of extracting the internal, sometimes hidden and unmeasurable, state, $x(t)$, from the measurement $z(k)$. Applications of the filtering process are very common, to name a few, such as classifying the component materials from hyperspectral imagery, obtaining the aircraft position and attitude from the accelerometer and gyro measurements of an Inertial Measurement Unit, and tracking a target's velocity and acceleration from a Radar's positional measurements.

Under the conditions of a linear system with linear measurements, a Gaussian system noise and a Gaussian measurement noise, a linear Kalman filter provides an optimal estimate of the internal system state. The estimate is optimal in the sense that the covariance of the estimate is minimal, the residuals are a white Gaussian noise process, and innovative information is absent in the residuals. If selectively, the system model and the measurement model are nonlinear, extracting an estimate of the internal system state, $x(t)$, from noisy measurements, $z(k)$, is conventionally accomplished by an extended Kalman filter, and selectively, in some cases, by a variant of the extended Kalman filter. An extended Kalman filter shares most of the salient features with a linear Kalman filter, by linearizing the nonlinear system equations and measurement equations about the most recent estimate and taking a first-order approximation to a Taylor-series expansion.

In the nonlinear cases, an optimal estimate of the system state is difficult for the extended Kalman filter to attain. A direct implementation of an extended Kalman filter possesses several inherent drawbacks. First, it is prone to numerical divergence. The correct propagation of the state estimates relies on the proper propagation of a covariance error matrix, which must remain symmetric and positive definite all the time, due to its mathematical definition. Finite-length manipulations, such as computer roundoff error, usually result in a loss of the symmetry and positive definiteness of the covariance error matrix resulting in numerical instability. A feasible approach is unavailable to recover from such a numerical divergence status.

An extended Kalman filter passively accepts measurements and is sensitive to measurement quality. Conventionally, it accepts whatever measurement data the measurement input interface provides in full confidence. The Kalman filter is unable to distinguish good-quality measurements from low-quality ones. It generally does not attempt to correct the measurement data by any means even though there might be enough evidence that the quality of measurement data is very poor. When the quality of the measurements applied to the Kalman filter is worse than that accounted for by the measurement noise, the results generated by the Kalman filter are usually meaningless, and yet, it is difficult to determine whether the results are meaningless.

Another difficulty in a conventional extended Kalman filter is the requirement of discretizing the continuous-time differential model into a discrete-time difference model. This in turn requires the selection of a discretization time prior to the design of the extended Kalman filter. A standard method is to set the discretization time the same as the sampling period of the measurements. Such a prediscretization approach does not guarantee that the discrete-time difference model is a good approximation to the continuous-time differential model, especially in the case of a slow sampling rate. Neither is this prediscretization approach able to detect a divergence of the discrete-time difference model from the continuous-time differential model when the divergence occurs.

SUMMARY OF THE PRESENT INVENTION

An objective of the present invention is to provide a universal robust filtering process for the most general formulation, in the sense that the system dynamics are described by nonlinear continuous-time differential equations, and the nonlinear measurements are taken at intermittent discrete times randomly spaced, wherein the selection of a discretization time for the continuous-time differential model is unnecessary, which possesses wider applications, better accuracy, better stability, easier design, and easier implementation.

Another objective of the present invention is to provide a universal robust filtering process, wherein the propagation of the system state estimate between two consecutive measurement instants in the time update is governed by an adaptive stepsize control, which automatically determines the time step and guarantees the convergence.

Another objective of the present invention is to provide a universal robust filtering process, which validates measurement data, in order to reject poor-quality measurement data before they are fed into the filter.

Another objective of the present invention is to provide a universal robust filtering process, which corrects measurement data, in order to correct low-quality measurement data before they are fed into the filter.

Another objective of the present invention is to provide a universal robust filtering process, comprising an adaptive stepsize control to automatically compute the stepsize to propagate the backward state estimate in the backward time update.

Another objective of the present invention is to provide a universal robust filtering process, wherein square root implementations are enforced for covariance matrix propagation, wherever applied, to ensure numerical stability.

Another objective of the present invention is to provide a universal robust filtering process, wherein the system state estimates are obtained by using, selectively, forward estimating solution, and combined forward estimating solution and backward smoothing solution.

Accordingly, in order to accomplish the above objectives, the present invention provides a universal robust filtering process which comprises the steps of:

(a) inputting measurement data, such as target position in the tracking applications, from a measurement input interface into a fuzzy logic validation module;

(b) providing an expected measurement in the fuzzy logic validation module;

(c) validating the input measurement data through a fuzzy logic inference process in the fuzzy logic validation module, by comparing with the expected measurement, and outputting an approved measurement, a corrected measurement and a rejected-measurement flag to a state estimate module;

(d) producing estimates of system state based on the approved measurement and corrected measurement output from the fuzzy logic validation module in the state estimate module which processes three different activities based on three different inputs in the fuzzy logic validation module; and (e) outputting the obtained estimates of system state by a state estimate output interface.

DETAILED DESCRIPTION OF THE PREFERRED EMBODIMENT

The present invention substantially solves the problems of extracting internal state information of a dynamic system from noisy measurements. The present invention provides a method that automatically determines the time step in the propagation of the system state estimate between two consecutive measurement instants in the time update, based upon accuracy and convergence considerations. The present invention eliminates the requirement of selecting a discretization time to discretize a continuous-time differential model into a discrete-time difference model prior to the design of the filter, which is the primary first step in the conventional approach.

Figure 1:
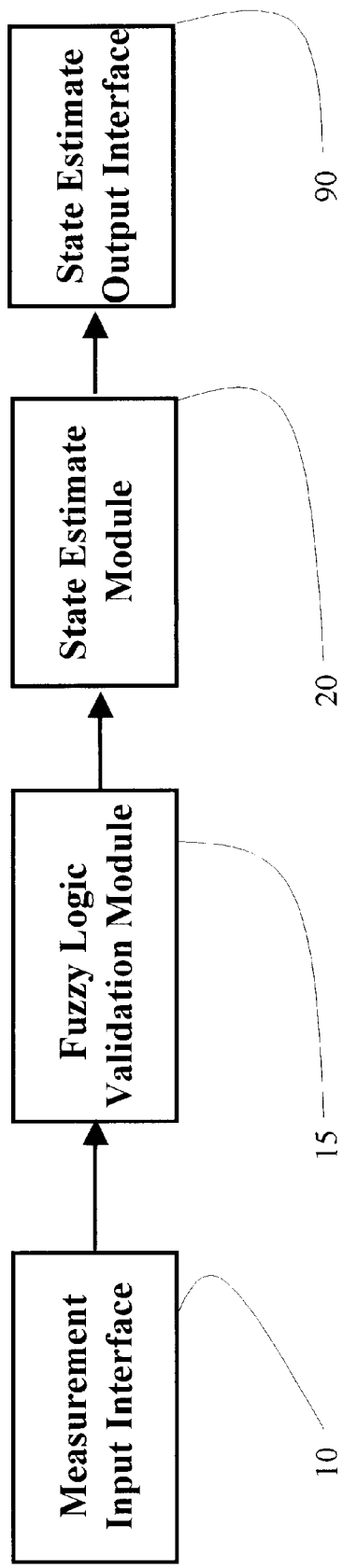
FIG. 1 illustrates a universal robust filtering process of the present invention.

Referring to FIG. 1, the universal robust filtering process of the present invention comprises the following steps.

(a) Input measurement data, such as target position in the tracking applications, from a measurement input interface 10 into a fuzzy logic validation module 15.

(b) Provide an expected measurement in the fuzzy logic validation module.

(c) Validate the input measurement data through a fuzzy logic inference process in the fuzzy logic validation module 15, by comparing with the expected measurement, and (i) outputting an approved measurement to a state estimate module 20 by approving the input measurement data by the fuzzy logic validation module 15 when a discrepancy between the expected measurement and the input measurement data lies close within a prescribed acceptance range, wherein the input measurement is considered to be useful and accepted;

(ii) outputting a rejected-measurement flag to the state estimate module 20 by rejecting the input measurement data by the fuzzy logic validation module 15 when the discrepancy between the expected measurement and the input measurement data goes beyond a prescribed rejection range, wherein the measurement input is considered to be useless and rejected; and (iii) outputting a corrected measurement to the state estimate module 20 by correcting the input measurement data by the fuzzy logic validation module 15 when the discrepancy between the expected measurement and the input measurement data lies between the prescribed acceptance range and the prescribed rejection range, wherein the measurement input is considered to be useful and corrected measurement data are generated.

Figure 2:
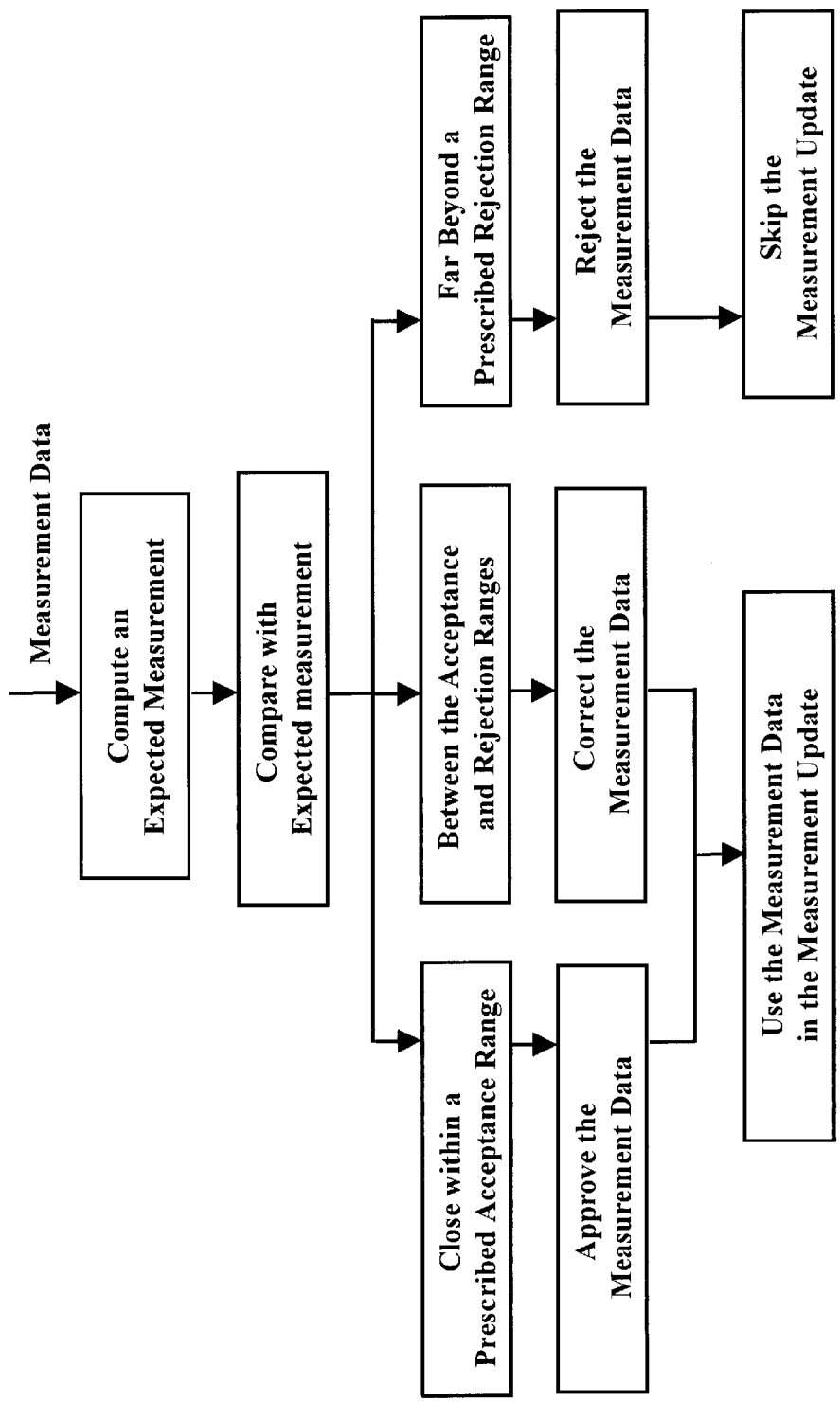
FIG. 2 is a block diagram of the universal robust filtering process of the present invention, illustrating the measurement data validation process thereof.

(d) Produce an estimate of system state based on the approved measurement and corrected measurement output from the fuzzy logic validation module 15 in the state estimate module 20 which processes three different activities based on three different inputs in the fuzzy logic validation module 15, referring to FIG. 2, including (i) extracting a first estimate of system state from the approved measurement passed from the fuzzy logic validation module 15;

(ii) extracting a second estimate of system state from the corrected measurement sent from the fuzzy logic validation module 15; and (iii) predicting a third estimate of system state without measurement data when receiving the rejected measurement flag from the fuzzy logic validation module 15.

(e) output the obtained first, second and third estimates of system state by a state estimate output interface 90.

Referring to FIG. 1, the fuzzy logic validation step (c) of the universal robust filtering process of the present invention provides a reference standard to examine the quality of the measurement. The kernel of the fuzzy logic validation is a fuzzy rule base, which is established from system dynamics characteristics and measurement relationships. The measurement data are of any nature, including but not limited to target position, velocity, and acceleration in the tracking applications, spectral intensity in different bands in the hyperspectral applications, and accelerometer and gyro measurements in inertial navigation applications. Within the fuzzy logic validation, an expected measurement is computed and compared to the measurement input. When the discrepancy between the expected measurement and the measurement input lies in a prescribed acceptance range, the measurement input is considered to be useful and accepted. When the discrepancy between the expected measurement and the measurement input goes beyond a prescribed rejection range, the measurement input is considered to be useless and rejected. When the discrepancy between the expected measurement and the measurement input lies between the acceptance range and the rejection range, the measurement input is considered to be useful and corrected measurement data are generated.

Figure 3:
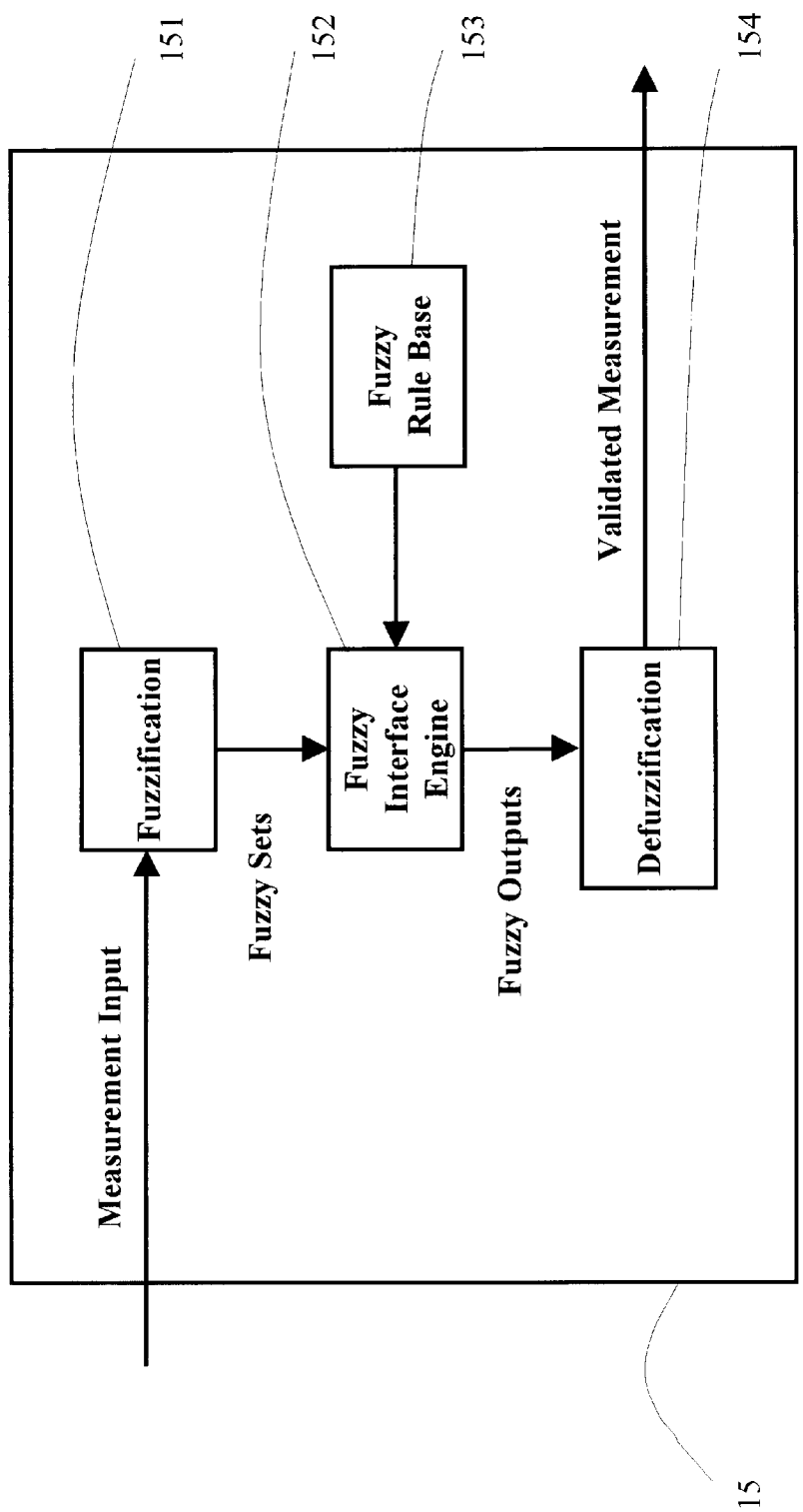
FIG. 3 is a block diagram illustrating the fuzzy logic inference process of the universal robust filtering process of the present invention.

The measurement data is provided by the measurement input interface 10 to the fuzzy logic validation module 15. Referring to FIG. 3, the step (c) further comprises the following steps:

(c1) Receive the original measurement data from the measurement input interface 10 in a fuzzifier module 151. Perform a scale mapping on the original measurement data, which transfers the range of measurement into a corresponding universe of discourse. Perform fuzzification and convert the measurement data into suitable linguistic values which are labeled as fuzzy sets. Interpret the crisp measurement data as fuzzy sets with membership functions belonging to [0, 1]. Output these fuzzy sets to a fuzzy interface engine 152.

(c2) Receive the fuzzy sets from the fuzzifier module 151 in a fuzzy interface engine 152, wherein human decision making is simulated to infer fuzzy outputs, using fuzzy implication and the fuzzy logic inference rules, and the fuzzy logic inference rules are supported by a fuzzy rule base 153. Send the obtained fuzzy outputs to a defuzzifier module 154.

(c3) Provide the fuzzy logic inference rules for the fuzzy interface engine 152 in the fuzzy rule base 153 which characterizes goals and domain knowledge of experts by means of a set of linguistic rules, wherein the fuzzy rule base 153 comprises the knowledge of the application domain and the attendant goal. Primarily determine the performance of the fuzzy logic validation 15 by the fuzzy rule base 153.

(c4) Receive the fuzzy outputs from the fuzzy interface engine 152 in the defuzzifier module 154. Selectively, it approves the original measurement data (approved measurement) and passes it down without change to the state estimate module 20, generates a crisp corrected measurement data (corrected measurement) that best represents the possibility distribution of the inferred fuzzy outputs from the fuzzy interface engine 152 and outputs the corrected measurement data (corrected measurement) to the state estimate module 20, and rejects the measurement data and outputs the rejected-measurement flag to the state estimate module 20.

In the step (d), the output from the defuzzifier module 154 in the fuzzy logic validation module 15 is processed to produce the estimate of system state in the state estimate module 20. The state estimate module 20 of the present invention provides two options, forward filtering, referring to FIG. 4, and backward smoothing, referring to FIG. 5. Backward smoothing requires that forward filtering be executed first and forward filtering results are stored. Forward filtering is suitable for real-time applications, while backward smoothing is useful in non-real-time applications with a higher accuracy.

To accommodate randomly spaced measurement intervals, the measurement data is required to be clearly time-stamped, such that the interval span between two consecutive valid measurements is computed to monitor how long the state estimate propagates without a measurement update in a time update 202 in the state estimate module 20.

Figure 4:
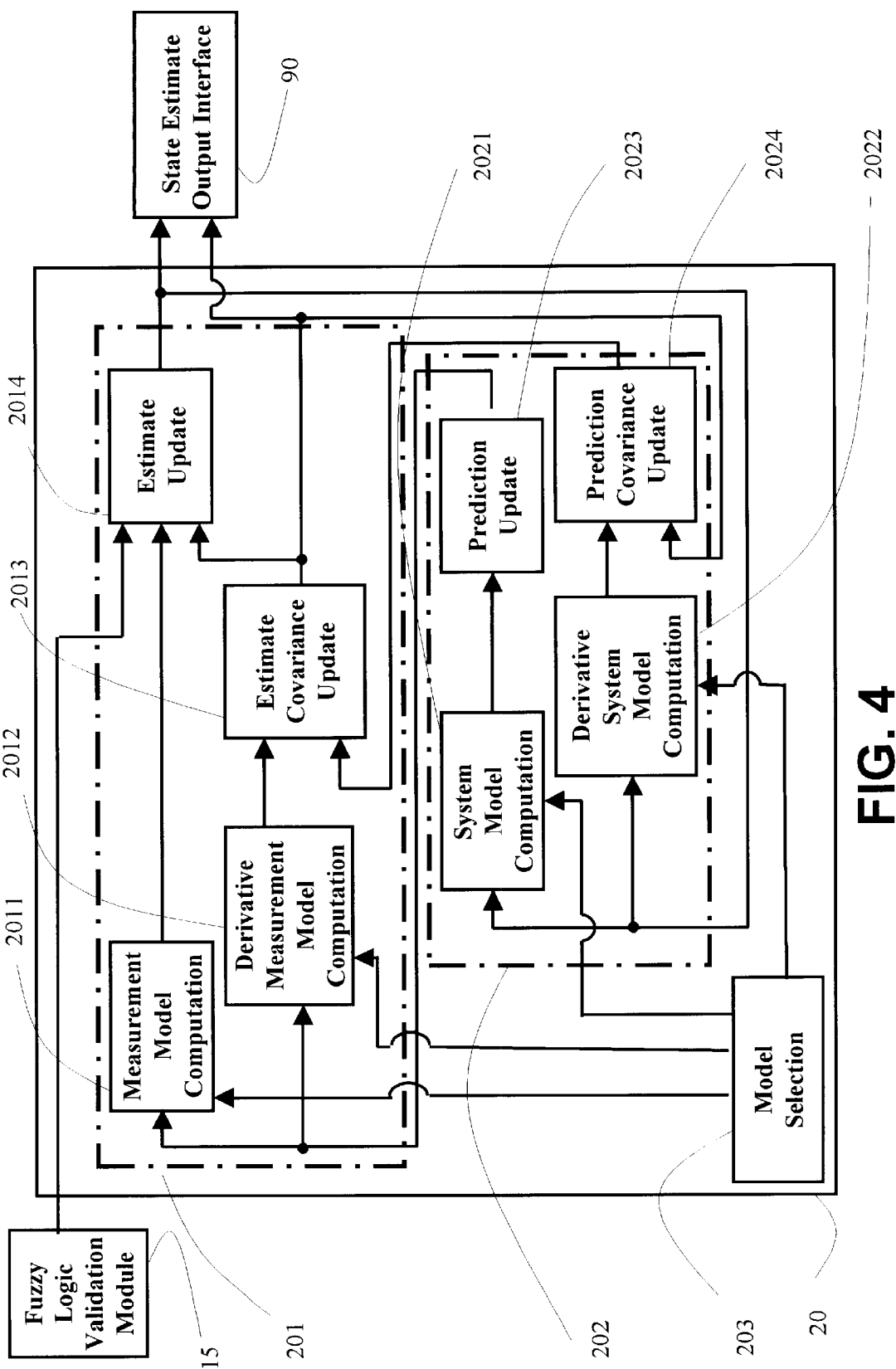
FIG. 4 is a block diagram illustrating the first preferred implementation of the state estimate module, forward filtering, according to the universal robust filtering process of the present invention.

The first preferred processing of the step (d), forward filtering, as shown in FIG. 4, further comprises the following steps.

(d1) Compute a model relevant information for the time update 202 and a measurement update 201 in a model selection 203. Specifically, the model selection 203 provides an initial condition of the system estimate for a system model computation 2021 in the time update 202, an initial condition of the covariance error matrix for a derivative system model computation 2022 in the time update 202, a system model for the system model computation 2021 in the time update 202, a derivative system model for the derivative system model computation 2022 in the time update 202, a measurement model for a measurement model computation 2011 in the measurement update 201, and a derivative measurement model for a derivative measurement model computation 2012 in the measurement update 201.

(d2) Propagate the state estimate during the interval of the last two consecutive valid measurements in the time update 202. The time update is exclusively based upon the system model. Denote by $\hat{x}(t_{k-1})$ and $P(t_{k-1})$ the state estimate and its associated covariance error matrix at time $t_{k-1}$, respectively, just after the last measurement z(k−1) at $t_{k-1}$ has been processed by the measurement update 201. The step (d2) also comprises the steps of:

(d2-1) computing the interval span between the last two consecutive valid measurements z(k−1) and z(k). wherein this interval span, calculated by $$t_k - t_{k-1}$$

determines how long the time update propagates without a measurement update;

(d2-2) receiving the system model from the model selection 203 and computing a time derivative of the system state at the latest estimate of the system state $\hat{x}(t_{k-1})$ in the system model computation 2021, $$\dot{\hat{x}}(t_{k-1}) = f(\hat{x}(t_{k-1}))$$

(d2-3) receiving the derivative system model from the model selection 203 and computing a time derivative of a covariance error matrix for the system state at the latest estimate of the system state $\hat{x}(t_{k-1})$ in the derivative system model computation 2022, $$\dot{P}(t_{k-1}) = F(t_{k-1})P(t_{k-1}) + P(t_{k-1})F^T(t_{k-1}) + Q(t_{k-1})$$

where the Jacobian matrix $F(t_{k-1})$ is calculated at $\hat{x}(t_{k-1})$ by $$F(t_{k-1}) = \left.\frac{\partial f(x)}{\partial x}\right|_{x=\hat{x}(t_{k-1})}$$

(d2-4) propagating the state estimate by utilizing the time derivative of the system state estimate $\hat{x}(t_{k-1})$ computed in the system model computation 2021 in a prediction update 2023, using a Runge-Kutta integration algorithm with adaptive stepsize control, $$\hat{x}(t_{k-1}) \rightarrow \hat{x}(t_k)$$

(d2-5) propagating the covariance error matrix of the state estimate by utilizing the time derivative of the covariance error matrix $\dot{P}(t_{k-1})$ computed in the derivative system model computation 2022 in a prediction covariance update 2024, using a factorized implementation which is detailed later, to ensure the symmetry and positive definiteness of $P(t)$ during the propagation, $$P(t_{k-1}) \rightarrow P(t_k)$$

(d3) Correct the state estimate by using the latest measurement data $z(k)$ at $t_k$ in the measurement update 201. The measurement update is based upon the measurement model and the measurement data. In the case that a rejected-measurement flag is received corresponding to $z(k)$ from the fuzzy logic validation 15, the measurement update for $z(k)$ is skipped and the time update continues. When $z(k)$ is adopted, the results obtained in the time update are utilized as the initial conditions. Denote by $\hat{x}\_(k)$ and $P\_(k)$ the state estimate and its associated covariance error matrix at time $t_k$, respectively, obtained from the time update 202 just before the last measurement $z(k)$ at $t_k$ is processed by the measurement update 201, $$\hat{x}\_(k) = \hat{x}(t_k^-)$$

$$P\_(k) = P(t_k^-)$$

wherein the step (d3) further comprises the steps of:

(d3-1) receiving the measurement model from the model selection 203 and computing a predicted measurement at the latest estimate of the system state $\hat{x}\_(k)$ in the measurement model computation 2011, as follows, $$\hat{z}(k) = h(\hat{x}\_(k))$$

(d3-2) receiving the derivative measurement model from the model selection and computing a measurement Jacobian matrix at the latest estimate of the system state $\hat{x}\_(k)$ in the derivative measurement model computation 2012, $$H(k) = \left.\frac{\partial h(x)}{\partial x}\right|_{x=\hat{x}\_(k)}$$

(d3-3) updating the covariance error matrix using the measurement update equations in the estimate covariance update 2013, as follows, $$P_+(k) = [I - K(k)H(k)]P\_(k)$$

$$K(k) = P\_(k)H^T(k)\eta^{-1}(k)$$

$$\eta(k) = H(k)P\_(k)H^T(k) + R(k)$$

wherein a factorized implementation is detailed later, to ensure the symmetry and positive definiteness of $P_+(k)$.

(d3-4) updating the estimate of the system state using the measurement update equations in the estimate update 2014, $$\hat{x}_+(k) = \hat{x}\_(k) + K(k)[z(k) - \hat{z}(k)]$$

The steps (d2) and (d3) constitute a complete forward filtering process for the measurement data $z(k)$. When a new valid measurement data $z(k+1)$ becomes available, a new time update is initiated, based on the initial conditions, $$\hat{x}(t_k) = \hat{x}_+(k)$$

$$P(t_k) = P_+(k)$$

It should be noted that the universal robust filter is applicable to practically any applications, because the user is allowed to change the system model and measurement model to fit his/her own applications via the model selection 203. The model selection is an integral part of the universal robust filter. The system model is described in nonlinear continuous-time differential equations. The measurable model is formulated in nonlinear discrete-time equations.

In some applications where a real time requirement is not stringent and higher accuracy is desired, backward smoothing, which exploits future measurements to improve the current state estimates, is useful. Backward smoothing is not started until the predetermined range of the measurement data has been received. Smoothing is performed backwards in time. The backward filter operates recursively on the measurement data, beginning at the terminal time and proceeding toward the desired smoothing point.

Figure 5:
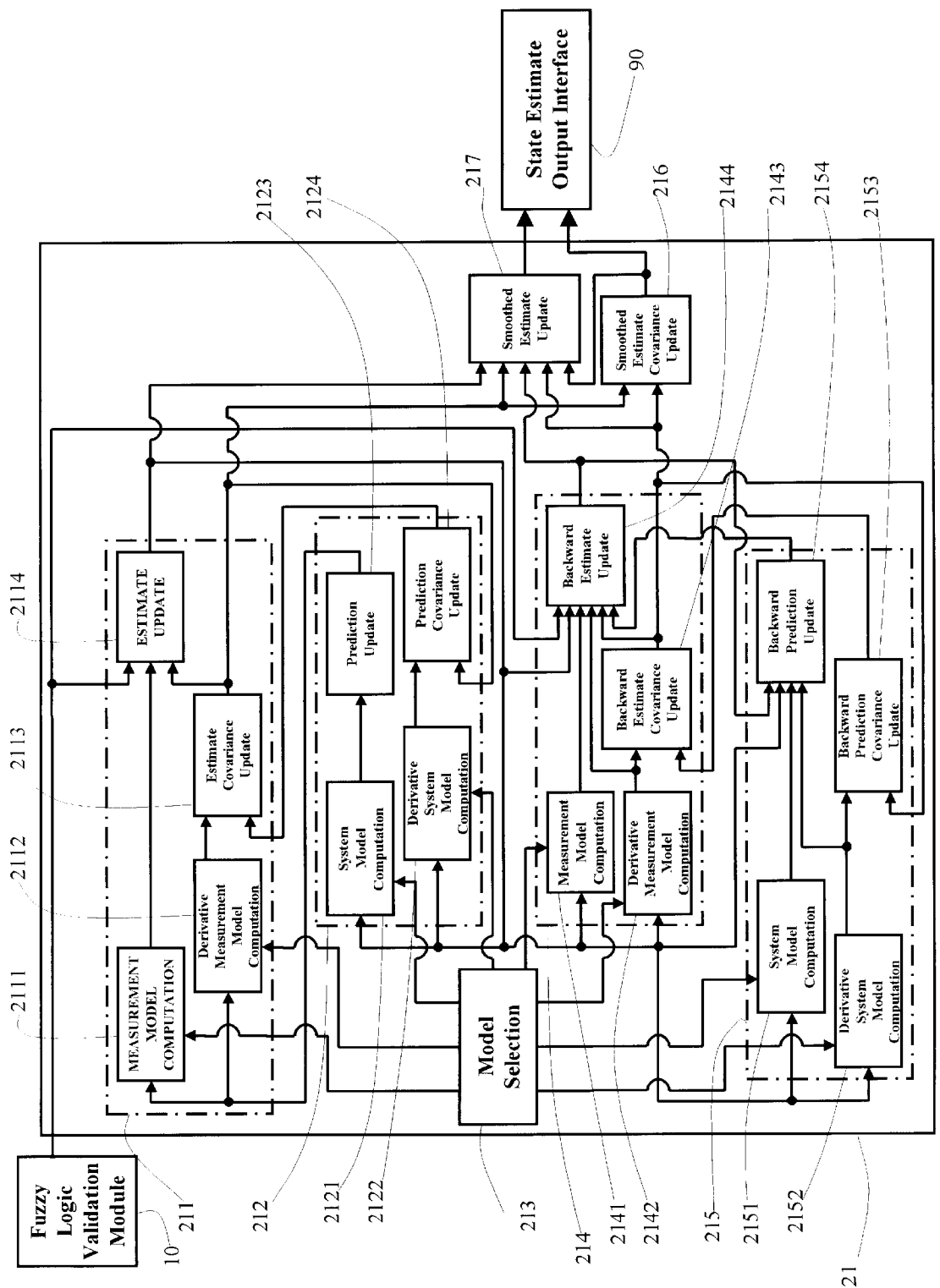
FIG. 5 is a functional block diagram illustrating the second preferred implementation of the state estimate module, backward smoothing, according to the universal robust filtering process of the present invention.

Referring to FIG. 5, the universal robust filter 21 for backward smoothing includes a model selection 213, a forward measurement update 211, a forward time update 212, a backward measurement update 214, and a backward time update 215. The forward measurement update 211 and the forward time update 212 comprise the forward filtering portion. The forward measurement update 211, the forward time update 212, as well as their contained subblocks, a measurement model computation 2111, a derivative measurement model computation 2112, an estimate covariance update 2113, an estimate update 2114, a system model computation 2121, a derivative system model computation 2122, a prediction update 2123, a prediction covariance update 2124, are exactly the same as their corresponding blocks in FIG. 4. The backward measurement update 214 and the backward time update 215 include the backward filtering portion. Forward filtering results and backward filtering results are combined in a smoothed estimate covariance update 216 and a smoothed estimate update 217 to provide smoothed results.

Referring to FIG. 5, the second preferred processing of the step (d), backward smoothing, further comprises the following additional steps:

(d4) Calculate the interval from which a backward smoothed estimate is extracted. By defining $\tau = T - t$ and $\tau_k = T - t_{N-k}$ with T the terminal time, the system dynamic equation and the measurement equation are reformulated as $$\frac{d}{d\tau}x(T-\tau) = -f(x(T-\tau)) + w(T-\tau)$$

(d5) Perform the first preferred processing steps D2 (D2-1~D2-5) and D3 (D3-1~D3-4) to compute the forward state estimate $\hat{x}(t)$ and its covariance error matrix $P(t)$ in the forward measurement update 211 and the forward time update 212.

(d6) Propagate the backward estimate during the interval of the last two consecutive reversed measurements in the backward time update 215. The backward time update is exclusively based upon the backward system model. Define $\hat{x}_b(\tau_{k-1})$ and $P_b(\tau_{k-1})$ the backward state estimate and its associated covariance error matrix for the backward system model at time $\tau_{k-1}$, respectively, just after the last reversed measurement $z(N-k+1)$ has been processed by the backward measurement update 214. The initial condition, $\hat{x}_b(0)$, is chosen as $\hat{x}(T)$, and the initial condition, $P_b(0)$, is set to be a diagonal matrix with large diagonal elements, wherein the step (d6) further comprise the steps of:

(d6-1) computing the interval span between the last two consecutive reserved valid measurements $z(N-k+1)$ and $z(N-k)$. This interval span, $\tau_k - \tau_{k-1} = t_{N-k+1} - t_{N-k}$, determines how long the backward time update propagates without a measurement update;

(d6-2) receiving the system model and the derivative system model from the model selection 213, computing a system function and a Jacobian matrix at the forward state estimate $\hat{x}(T-\tau_{k-1})$ obtained in forward filtering, and calculating a time derivative of the backward system state in the system model computation 2151, $$\dot{\hat{x}}_b(\tau_{k-1}) = -f(\hat{x}(T-\tau_{k-1})) - F(T-\tau_{k-1})[\hat{x}_b(\tau_{k-1}) - \hat{x}(T-\tau_{k-1})]$$

where the Jacobian matrix $F(T-\tau_{k-1})$ is calculated at $\hat{x}(T-\tau_{k-1})$ by $$F(T-\tau_{k-1}) = \frac{\partial f(x)}{\partial x}\bigg|_{x=\hat{x}(T-\tau_{k-1})}$$

(d6-3) receiving the derivative system model from the model selection 213 and computing a time derivative of the covariance error matrix for the backward system state at the forward state estimate $\hat{x}(T-\tau_{k-1})$ in the derivative system model computation 2152, $$\dot{P}_b(\tau_{k-1}) = -F(T-\tau_{k-1})P_b(\tau_{k-1}) - P_b(\tau_{k-1})F^T(T-\tau_{k-1}) + Q(T-\tau_{k-1})$$

(d6-4) propagating the backward state estimate by utilizing the time derivative of the backward system state $\dot{\hat{x}}_b(\tau_{k-1})$ computed in the system model computation 2151 in a backward prediction update 2154, using a Runge-Kutta integration algorithm with adaptive step-size control, $$\hat{x}_b(\tau_{k-1}) \rightarrow \hat{x}_b(\tau_k)$$

(d6-5) propagating the covariance error matrix of the backward state estimate by utilizing the time derivative of the covariance error matrix $\dot{P}_b(\tau_{k-1})$ computed in the derivative system model computation 2152 in a backward prediction covariance update 2153, using a factorized implementation which is detailed later, to ensure the symmetry and positive definiteness of $P_b(\tau)$ during the propagation, $$P_b(\tau_{k-1}) \rightarrow P_b(\tau_k)$$

(d7) Correct the backward state estimate by using the reversed measurement data $z(N-k)$ at time $\tau_k$ in the backward measurement update 214. The measurement update is based upon the measurement model and the measurement data. The results obtained in the backward time update are utilized as the initial conditions. Denote by $\hat{x}_{b-}(k)$ and $P_{b-}(k)$ the backward state estimate and its associated covariance error matrix at time $\tau_k$, respectively, obtained from the backward time update 215 just before the new reversed measurement $z(N-k)$ at time $\tau_k$ is processed by the backward measurement update 214, $$\hat{x}_{b-}(k) = \hat{x}_b(\tau_k^-)$$

$$P_{b-}(k) = P_b(\tau_k^-)$$

wherein the step (d7) further comprises the steps of:

(d7-1) receiving the measurement model from the model selection 213 and computing a predicted measurement at the forward state estimate $\hat{x}(N-k)$ in the measurement model computation 2141, $$\hat{z}_b(k) = h(\hat{x}(N-k))$$

(d7-2) receiving the derivative measurement model from the model selection 213 and computing a measurement Jacobian matrix at the forward state estimate $\hat{x}(N-k)$ in the derivative measurement model computation 2142, $$H(N-k) = \frac{\partial h(x)}{\partial x}\bigg|_{x=\hat{x}(N-k)}$$

(d7-3) updating the covariance error matrix of the backward system estimate using the backward measurement update equations in the backward estimate covariance update 2143, $$P_{b+}(k) = [I - K_b(k)H(N-k)]P_{b-}(k)$$

$$K_b(k) = P_{b-}(k)H^T(N-k)\eta_b^{-1}(k)$$

$$\eta_b(k) = H(N-k)P_{b-}(k)H^T(N-k) + R(N-k)$$

wherein a factorized implementation is detailed later, to ensure the symmetry and positive definiteness of $P_{b+}(k)$, (d7-4) updating the backward state estimate using the backward measurement update equations in the backward estimate update 2144, $$\hat{x}_{b+}(k) = \hat{x}_{b-}(k) + K_b(k)[z(N-k) - \hat{z}_b(k) - H(N-k)(\hat{x}_{b-}(k) - \hat{x}(N-k))]$$

The steps (d6) and (d7) constitute a complete backward filtering process for the reversed measurement data $z(N-k)$. For the next reversed measurement data $z(N-k-1)$, a new backward time update is started, based on the initial conditions, $$\hat{x}_b(\tau_k) = \hat{x}_{b+}(k)$$

$$P_b(\tau_k) = P_{b+}(k)$$

(d8) Compute a covariance error matrix for a smoothed state estimate using the covariance error matrix of the forward system estimate and the covariance error matrix of the backward system estimate in a smoothed estimate covariance update 216, $$P(t|T) = [P^{-1}(t) + P_b^{-1}(t)]^{-1}$$

(d9) Compute the smoothed state estimate using the forward system estimate and the backward system estimate in a smoothed estimate update 217, $$\hat{x}(t|T)=P(t|T)[P^{-1}(t)\hat{x}(t)+P_b^{-1}(t)\hat{x}_b(t)]$$

To assure filtering/smoothing accuracy and numerical stability, the propagation of the covariance error matrix is accomplished using a factorized implementation. Instead of computing P(t), the factorized implementation propagates $P^{1/2}(t)$ at each iteration, where $P(t)=P^{1/2}(t) P^{T/2}(t)$, $P^{1/2}(t)$ is a lower triangular matrix, and $P^{T/2}(t)$ is the upper triangular transpose of $P^{1/2}(t)$.

In the step (d2-5), updating $P^{T/2}(t_{k-1})$ from time $t_{k-1}$ to $t_{k-1}+\Delta t$ is accomplished using the numerically stable QR decomposition, $$P^{T/2}(t_{k-1})+[P^{T/2}(t_{k-1})F^T(t_{k-1})+\tfrac{1}{2}P^{-\tfrac{1}{2}}(t_{k-1})Q(t_{k-1})]\Delta t=\Gamma_1 P^{T/2}(t_{k-1}+\Delta t)$$

The above QR decomposition is completed in two steps. First, the matrix on the left-hand side is constructed. Then, QR decomposition is performed on the constructed matrix, and the right-hand side matrices are obtained, with $\Gamma_1$ an orthogonal matrix which satisfies $\Gamma_1^T\Gamma_1=I$. In this process, the orthogonal matrix $\Gamma_1$ is not required to be saved. Only the upper triangular matrix $P^{T/2}(t_{k-1}+\Delta t)$, which is the updated covariance error matrix, is needed to be kept.

Figure 6:
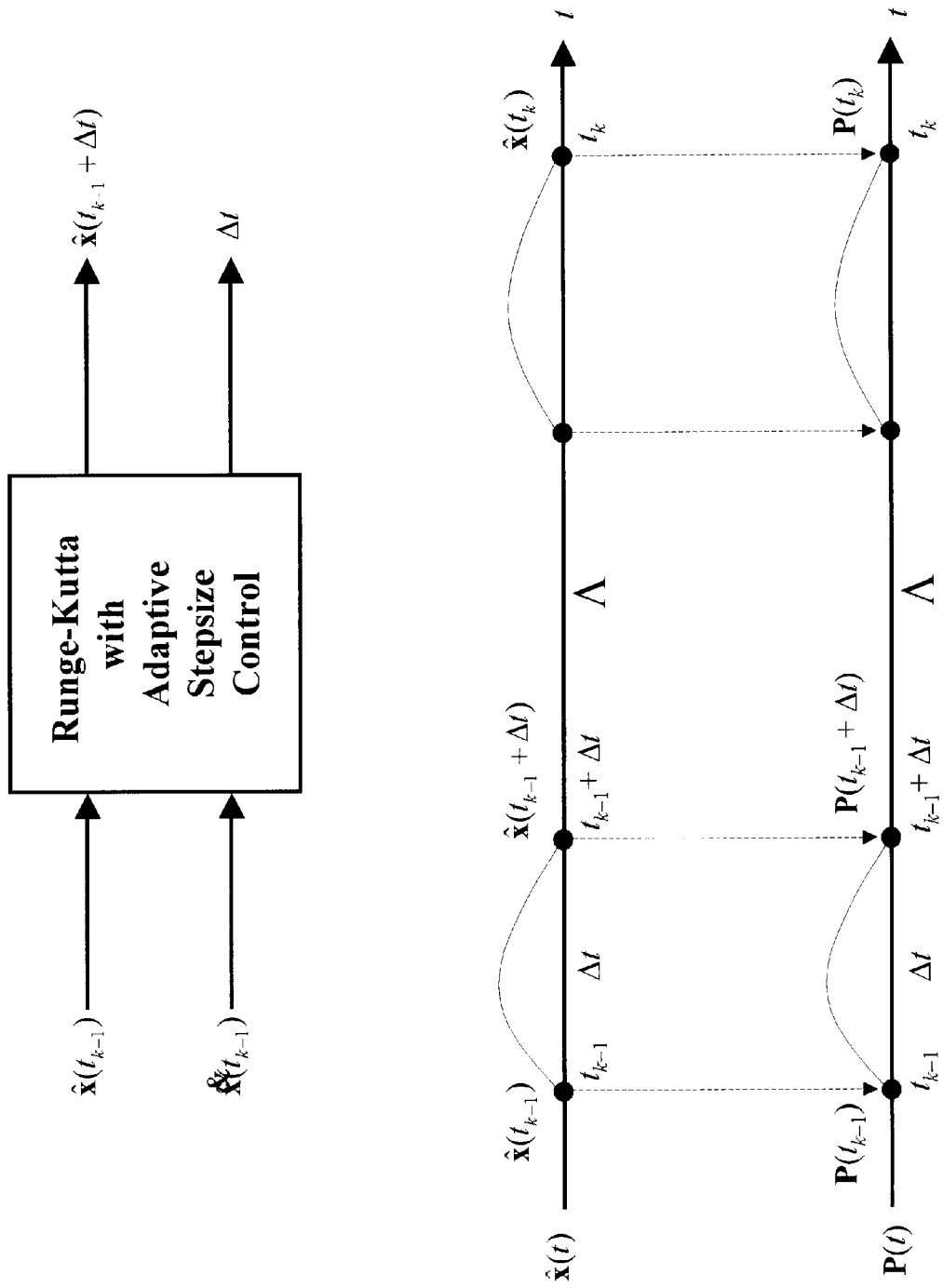
FIG. 6 is a graphical illustration showing the procedures of determining the time steps in the time update according to the universal robust filtering process of the present invention.

Referring to FIG. 6, the time step used in updating $P^{T/2}(t_{k-1})$ from time $t_{k-1}$, $\Delta t$, is inherited from step D2-4, in which a Runge-Kutta integration algorithm with adaptive stepsize control is used. Based on the current state estimate, $\hat{x}(t_{k-1})$, and the time derivative of the system state, $\hat{\dot{x}}(t_{k-1})$, the Runge-Kutta adaptive stepsize control integration algorithm produces the stepsize to propagate the state estimate, $\Delta t$, and the updated state estimate, $\hat{x}(t_{k-1}+\Delta t)$. It is thus possible that multiple steps are taken for updating $\hat{x}(t_{k-1})$ from time $t_{k-1}$ to $t_k$. Updating of $P^{T/2}(t_{k-1})$ from time $t_{k-1}$ to $t_k$ follows the exactly same time steps as those used in updating $\hat{x}(t_{k-1})$ from time $t_{k-1}$ to $t_k$.

In the step (d3-3), updating the covariance error matrix in the measurement update is accomplished using QR decomposition, $$\begin{pmatrix} R^{T/2}(k) & 0 \\ P_-^{T/2}(k)H^T(k) & P_-^{T/2}(k) \end{pmatrix} = \Gamma_2 \begin{pmatrix} \eta^{T/2}(k) & \eta^{-1/2}(k)H(k)P_-(k) \\ 0 & P_+^{T/2}(k) \end{pmatrix}$$

The QR decomposition is completed similarly. First, the matrix on the left-hand side is constructed. Then, QR decomposition is performed on the constructed matrix, and the right-hand side matrices are obtained, with $\Gamma_2$ an orthogonal matrix which satisfies $\Gamma_2^T\Gamma_2=I$. The orthogonal matrix $\Gamma_2$ is not required to be saved either.

In the step (d3-4), updating the state estimate in the measurement update is accomplished by utilizing the results obtained in the QR decomposition, as follows, $$\hat{x}_+(k) = \hat{x}_-(k) + \underbrace{P_-(k)H^T(k)\eta^{-T/2}(k)}_{\text{available in (1,2)-block}}\eta^{-1/2}(k)[z(k)-\hat{z}(k)]$$

The gain above is composed of two terms available from the QR decomposition. The first term, $P_-(k)H^T(k)\eta^{-T/2}(k)$, is directly derived from the transpose of the (1, 2)-block of the right-hand side upper triangular matrix. The second term, $\eta^{-\tfrac{1}{2}}(k)$, is calculated from the inversion of the (1, 1)-block of the right-hand side upper triangular matrix.

In the step (d6-5), updating $P_b^{T/2}(\tau_{k-1})$ from time $\tau_{k-1}$ to $\tau_{k-1}+\Delta\tau$ is accomplished using QR decomposition, $$P_b^{T/2}(\tau_{k-1})+[-P_b^{T/2}(\tau_{k-1})F^{T-\tau}{}_{k-1})+\tfrac{1}{2}P_b^{-\tfrac{1}{2}}(\tau_{k-1})Q(T-\tau_{k-1})]\Delta\tau = \Gamma_3 P_b^{T/2}(\tau_{k-1}+\Delta\tau)$$

The QR decomposition is completed in a similar way. First, the matrix on the left-hand side is constructed. Then, QR decomposition is performed on the constructed matrix, and the right-hand side matrices are obtained, with $\Gamma_3$ an orthogonal matrix which satisfies $\Gamma_3^T\Gamma_3=I$. The orthogonal matrix $\Gamma_3$ does not have to be saved.

The time step used in updating $P_b^{T/2}(\tau_{k-1})$ from time $\tau_{k-1}$, $\Delta\tau$, is obtained in a similar way to that in forward filtering. In the step (d6-4), based on the current backward state estimate, $\hat{x}_b(\tau_{k-1})$, and the time derivative of the system state, $\hat{\dot{x}}_b(\tau_{k-1})$, a Runge-Kutta integration algorithm with adaptive stepsize control produces the stepsize to propagate the backward state estimate, $\Delta\tau$, and the updated state estimate, $\hat{x}_b(\tau_{k-1}+\Delta\tau)$. It is possible that multiple steps are taken for updating $\hat{x}_b(\tau_{k-1})$ from time $\tau_{k-1}$ to $\tau_k$. Updating of $P_b^{T/2}(\tau_{k-1})$ from time $\tau_{k-1}$ to $\tau_k$ follows the exactly same time steps as those used in updating $\hat{x}_b(\tau_{k-1})$ from time $\tau_{k-1}$ to $\tau_k$.

In the step (d7-3), updating the backward covariance error matrix in the backward measurement update is accomplished using QR decomposition, $$\begin{pmatrix} R^{T/2}(N-k) & 0 \\ P_{b-}^{T/2}(k)H^T(N-k) & P_{b-}^{T/2}(k) \end{pmatrix} = \Gamma_2 \begin{pmatrix} \eta_b^{T/2}(k) & \eta_b^{-1/2}(N-k)H(k)P_{b-}(k) \\ 0 & P_{b+}^{T/2}(k) \end{pmatrix}$$

The QR decomposition is completed similarly. First, the matrix on the left-hand side is constructed. Then, QR decomposition is performed on the constructed matrix, and the right-hand side matrices are obtained, with $\Gamma_4$ an orthogonal matrix which satisfies $\Gamma_4^T\Gamma_4=I$. The orthogonal matrix $\Gamma_4$ is not required to be saved either.

In the step (d7-4), updating the backward state estimate in the backward measurement update is accomplished by utilizing the results obtained in the QR decomposition, $$\hat{x}_{b+}(k)=\hat{x}_{b-}(k)+K_b(k)[z(N-k)-\hat{z}_b(k)-H(N-k)(\hat{x}_{b-}(k)-\hat{x}(N-k))]$$

$$K_b(k)=[1,2]^T[1,1]^{-T}$$

where the gain matrix, $K_b(k)$, is composed of two terms available from the QR decomposition. The first term, $P_{b-}(k)H^T(N-k)\eta_b^{-T/2}(k)$, is directly derived from the transpose of the (1, 2)-block of the right-hand side upper triangular matrix. The second term, $\eta_b^{-\tfrac{1}{2}}(k)$, is calculated from the inversion of the (1, 1)-block of the right-hand side upper triangular matrix.

The present invention is highly applicable to hyperspectral image processing to detect the presence of a particular material and classify the comprising materials. Hyperspectral image sets contain large amounts of data that are difficult to exploit. Most materials have unique spectral signatures and if that signature can be observed or detected, then these materials can be identified with certainty. Prior techniques for hyperspectral imagery exploitation use classical pattern recognition methods. These methods include model based or least squares approaches to detect and classify materials present in the data. The present invention can be applied to hyperspectral image processing and pixel unmixing.

The application of the present invention to hyperspectral image processing comprises the following steps.

Select the system state elements to be the square root of abundance of the candidate materials, which guarantees the nonnegativeness of the abundance.

Establish a dynamical system model, by converting a two-dimensional spatial index (x, y) into a one-dimensional index k, and assume that the relationship of the square root of the abundance between two adjacent pixels is modeled as a Gauss-Markov process. The rule to the index conversion is that two consecutive pixel in one-dimension indexing must be physically adjacent.

Establish a measurement model, by assuming that the spectrum of a pixel is modeled as a linear mixture of spectral signatures of materials within the pixel. The constraint that the sum of abundance of all materials within a pixel equals to 1.0 is translated into an extra measurement equation.

Apply the universal robust filtering process in the present invention to estimate the abundance of the comprising materials for each pixel.

It should be noted that the system model established in the above steps is a discrete-time difference model, which is determined by the inherent discrete nature of the hyperspectral problem. The adaptive stepsize control of the present invention is thus unnecessary for the hyperspectral applications. Also, the system model is linear, based upon the Gauss-Markov process assumption for the relationship of the square root of the abundance between two adjacent pixels. Therefore, the hyperspectral image processing is nicely embodied into the application domain of the present invention as a special case.

What is claimed is:

1. A universal robust filtering process, comprising the steps of:
   (a) inputting measurement data from a measurement input interface into a fuzzy logic validation module;
   (b) providing an expected measurement in said fuzzy logic validation module;
   (c) validating said input measurement data through a fuzzy logic inference process in said fuzzy logic validation module by comparing with said expected measurement and outputting an approved measurement, a corrected measurement and a rejected-measurement flag to a state estimate module; and
   (d) producing an estimate of system state based on said approved measurement and corrected measurement output from said fuzzy logic validation module in said state estimate module.

2. A universal robust filtering process, as recited in claim 1, wherein, in the step (c), said approved measurement is output to said state estimate module approving said input measurement data by said fuzzy logic validation module when a discrepancy between said expected measurement and said input measurement data lies close within a prescribed acceptance range, wherein said input measurement is considered to be useful and accepted.

3. A universal robust filtering process, as recited in claim 2, wherein, in the step (c), said rejected-measurement flag is output to said state estimate module by rejecting said input measurement data by said fuzzy logic validation module when said discrepancy between said expected measurement and said input measurement data goes beyond a prescribed rejection range, wherein said measurement input is considered to be useless and rejected.

4. A universal robust filtering process, as recited in claim 3, wherein, in the step (c), said corrected measurement is output to said state estimate module by correcting said input measurement data by said fuzzy logic validation module when said discrepancy between said expected measurement and said input measurement data lies between said prescribed acceptance range and said prescribed rejection range, wherein said measurement input is considered to be useful and corrected measurement data are generated.

5. A universal robust filtering process, as recited in claim 4, wherein the step (d) further comprising said steps of:
   (i) extracting a first estimate of system state from said approved measurement passed from said fuzzy logic validation module;
   (ii) extracting a second estimate of system state from said corrected measurement sent from said fuzzy logic validation module; and
   (iii) predicting a third estimate of system state without measurement data when receiving said rejected measurement flag from said fuzzy logic validation module.

6. A universal robust filtering process, as recited in claim 5, after the step (d), further comprises a step (e) of outputting said obtained first, second and third estimates of system state by a state estimate output interface.

7. A universal robust filtering process, as recited in claim 1, wherein the step (c) further comprises the steps of:
   (c1) receiving said measurement data from said measurement input interface in a fuzzifier module,
      performing a scale mapping on said original measurement data, which transfers said prescribed acceptance range and said prescribed rejection range of measurement into a corresponding universe of discourse,
      perform fuzzification and converting said measurement data into suitable linguistic values which are labeled as fuzzy sets to form crisp measurement data,
      interpreting said crisp measurement data as fuzzy sets with membership functions, and
      output said fuzzy sets to a fuzzy interface engine.

8. A universal robust filtering process, as recited in claim 7, after the step (c1), further comprising the step of:
   (c2) receiving said fuzzy sets from said fuzzifier module in a fuzzy interface engine, wherein human decision making is simulated to infer fuzzy outputs which are sent to a defuzzifier module, by using fuzzy implication and said fuzzy logic inference rules provided by a fuzzy rule base.

9. A universal robust filtering process, as recited in claim 8, after the step (c2), further comprising the step of:
   (c3) providing said fuzzy logic inference rules for said fuzzy interface engine in said fuzzy rule base,
      characterizing goals and a domain knowledge of experts by means of a set of linguistic rules in said fuzzy rule base, wherein said fuzzy rule base comprises said knowledge of said application domain and said attendant goal, and
      primarily determining a performance of said fuzzy logic validation by said fuzzy rule base.

10. A universal robust filtering process, as recited in claim 9, after the step (c3), further comprising the step of:
   (c4) receiving said fizzy outputs from said fuzzy interface engine in said defuzzifier module,
      selectively approving said measurement data to form said approved measurement which is passed down without change to said state estimate module,
      generating crisp corrected measurement data to form said corrected measurement that represents a possibility distribution of said inferred fuzzy outputs from said fuzzy interface engine, and outputting said corrected measurement to said state estimate module, and
      rejecting said measurement data to form said rejected-measurement flag and outputting said rejected-measurement flag to said state estimate module.

11. A universal robust filtering process, as recited in claim 6, wherein, the step (c) further comprises the steps of:

(c1) receiving said measurement data from said measurement input interface in a fuzzifier module, performing a scale mapping on said original measurement data, which transfers said prescribed acceptance range and said prescribed rejection range of measurement into a corresponding universe of discourse, perform fuzzification and converting said measurement data into suitable linguistic values which are labeled as fuzzy sets to form crisp measurement data, interpreting said crisp measurement data as fuzzy sets with membership functions, and output said fuzzy sets to a fuzzy interface engine.

12. A universal robust filtering process, as recited in claim 11, after the step (c1), further comprising the step of:

(c2) receiving said fuzzy sets from said fuzzifier module in a fuzzy interface engine, wherein human decision making is simulated to infer fuzzy outputs which are sent to a defuzzifier module, by using fuzzy implication and said fuzzy logic inference rules provided by a fuzzy rule base.

13. A universal robust filtering process, as recited in claim 12, wherein after the step (c2) further comprises the step of:

(c3) providing said fuzzy logic inference rules for said fuzzy interface engine in said fuzzy rule base, characterizing goals and a domain knowledge of experts by means of a set of linguistic rules in said fuzzy rule base, wherein said fuzzy rule base comprises said knowledge of said application domain and said attendant goal, and primarily determining a performance of said fuzzy logic validation by said fuzzy rule base.

14. A universal robust filtering process, as recited in claim 13, after the step (c3), further comprising the step of:

(c4) receiving said fuzzy outputs from said fuzzy interface engine in said defuzzifier module, selectively approving said measurement data to form said approved measurement which is passed down without change to said state estimate module, generating crisp corrected measurement data to form said corrected measurement that represents a possibility distribution of said inferred fuzzy outputs from said fuzzy interface engine, and outputting said corrected measurement to said state estimate module, and rejecting said measurement data to form said rejected-measurement flag and outputting said rejected-measurement flag to said state estimate module.

15. A universal robust filtering process, as recited in claim 14, wherein the step (d) further comprises the step of:

(d1) computing a model relevant information for a time update and a measurement update in a model selection, wherein said model selection provides an initial condition of said system estimate for a system model computation in said time update, an initial condition of said covariance error matrix for a derivative system model computation in said time update, a system model for said system model computation in said time update, a derivative system model for said derivative system model computation in said time update, a measurement model for a measurement model computation in said measurement update, and a derivative measurement model for a derivative measurement model computation in said measurement update.

16. A universal robust filtering process, as recited in claim 15, after the step (d1), further comprising the step of:

(d2) propagating said state estimate during an interval of last two consecutive valid measurements in said time update which is based upon a system model; and (d3) correcting said state estimate by using a latest measurement data in said measurement update, said measurement update being based upon said measurement model and said measurement data, wherein when said rejected-measurement flag is received corresponding to said latest measurement data from said fuzzy logic validation, said measurement update for said latest measurement data is skipped and said time update continues, and that when said latest measurement data is adopted, results obtained in said time update are utilized as initial conditions.

17. A universal robust filtering process, as recited in claim 16, wherein said step (d2) further comprises the step of:

(d2-1) computing an interval span between said last two consecutive valid measurements in order to determine how long said time update propagates without said measurement update;

(d2-2) receiving said system model from a model selection and computing a time derivative of said system state at a latest estimate of said system state in said system model computation;

(d2-3) receiving said derivative system model from said model selection and computing a time derivative of a covariance error matrix for said system state at said latest estimate of said system state in said derivative system model computation;

(d2-4) propagating said state estimate by utilizing said time derivative of said system state computed in said system model computation in a prediction update, using a Runge-Kutta integration algorithm with adaptive stepsize control; and (d2-5) propagating said covariance error matrix of said state estimate by utilizing said time derivative of said covariance error matrix computed in said derivative system model computation in a prediction covariance update, using a factorized implementation.

18. A universal robust filtering process, as recited in claim 16, wherein said step (d3) further comprises the step of:

(d3-1) receiving said measurement model from said model selection and computing a predicted measurement at a latest estimate of system state in said measurement model computation, (d3-2) receiving said derivative measurement model from said model selection and computing a measurement Jacobian matrix at said latest estimate of system state in said derivative measurement model computation, (d3-3) updating said covariance error matrix by using measurement update equations in said estimate covariance update, and (d3-4) updating an optimal estimate of system state by using said measurement update equations in said estimate update.

19. A universal robust filtering process, as recited in claim 17, wherein said step (d3) further comprises the step of:

(d3-1) receiving said measurement model from said model selection and computing a predicted measurement at a latest estimate of system state in said measurement model computation, (d3-2) receiving said derivative measurement model from said model selection and computing a measurement Jacobian matrix at said latest estimate of system state in said derivative measurement model computation, (d3-3) updating said covariance error matrix by using measurement update equations in said estimate covariance update, and (d3-4) updating an optimal estimate of system state by using said measurement update equations in said estimate update.

20. A universal robust filtering process, as recited in claim 18, after the step (b3), further comprising the steps of:
(d4) calculating an interval from which a backward smoothed estimate is extracted;
(d5) obtaining said forward state estimate and a covariance error matrix thereof in a forward measurement update and a forward time update by performing the step (d2) and the step (d3);
(d6) propagating a backward estimate during said interval of said last two consecutive reversed measurements in a backward time update based upon said backward system model so as to define said backward state estimate and said associated covariance error matrix thereof for said backward system model respectively, just after said last reversed measurement being processed by said backward measurement update;
(d7) correcting said backward state estimate by using said reversed measurement data in a backward measurement update based upon said measurement model and said measurement data, wherein results obtained in said backward time update are utilized as initial conditions, wherein a state estimate and an associated covariance error matrix thereof obtained from said backward time update just before a new measurement is processed by said backward measurement update;
(d8) computing a covariance error matrix for a smoothed state estimate using said covariance error matrix of said forward system estimate and said covariance error matrix of said backward system estimate in a smoothed estimate covariance update; and
(d9) computing said smoothed state estimate using said forward system estimate and said backward system estimate in a smoothed estimate update.

21. A universal robust filtering process, as recited in claim 19, after the step (b3), further comprising the steps of:
(d4) calculating an interval from which a backward smoothed estimate is extracted;
(d5) obtaining said forward state estimate and a covariance error matrix thereof in a forward measurement update and a forward time update by performing the step (d2) and the step (d3);
(d6) propagating a backward estimate during said interval of said last two consecutive reversed measurements in a backward time update based upon said backward system model so as to define said backward state estimate and said associated covariance error matrix thereof for said backward system model respectively, just after said last reversed measurement being processed by said backward measurement update;
(d7) correcting said backward state estimate by using said reversed measurement data in a backward measurement update based upon said measurement model and said measurement data, wherein results obtained in said backward time update are utilized as initial conditions, wherein a state estimate and an associated covariance error matrix thereof obtained from said backward time update just before a new measurement is processed by said backward measurement update;
(d8) computing a covariance error matrix for a smoothed state estimate using said covariance error matrix of said forward system estimate and said covariance error matrix of said backward system estimate in a smoothed estimate covariance update; and
(d9) computing said smoothed state estimate using said forward system estimate and said backward system estimate in a smoothed estimate update.

22. A universal robust filtering process, as recited in claim 20, wherein said step (d6) further comprise said steps of:
(d6-1) computing said interval span between said last two consecutive reserved valid measurements so as to determine how long said backward time update propagates without a measurement update;
(d6-2) receiving said system model and said derivative system model from a model selection, computing a system function and a Jacobian matrix at said forward state estimate obtained in forward filtering, and calculating a time derivative of said backward system state in a system model computation;
(d6-3) receiving said derivative system model from said model selection and computing a time derivative of said covariance error matrix for said backward system state at said forward state estimate in a derivative system model computation;
(d6-4) propagating said backward state estimate by utilizing said time derivative of said backward system state computed in said system model computation in a backward prediction update, using a Runge-Kutta integration algorithm with adaptive stepsize control; and
(d6-5) propagating said covariance error matrix of said backward state estimate by utilizing said time derivative of said covariance error matrix computed in said derivative system model computation in a backward prediction covariance update, using a factorized implementation.

23. A universal robust filtering process, as recited in claim 21, wherein said step (d6) further comprise said steps of:
(d6-1) computing said interval span between said last two consecutive reserved valid measurements so as to determine how long said backward time update propagates without a measurement update;
(d6-2) receiving said system model and said derivative system model from a model selection, computing a system function and a Jacobian matrix at said forward state estimate obtained in forward filtering, and calculating a time derivative of said backward system state in a system model computation;
(d6-3) receiving said derivative system model from said model selection and computing a time derivative of said covariance error matrix for said backward system state at said forward state estimate in a derivative system model computation;
(d6-4) propagating said backward state estimate by utilizing said time derivative of said backward system state computed in said system model computation in a backward prediction update, using a Runge-Kutta integration algorithm with adaptive stepsize control; and
(d6-5) propagating said covariance error matrix of said backward state estimate by utilizing said time derivative of said covariance error matrix computed in said derivative system model computation in a backward prediction covariance update, using a factorized implementation.

24. A universal robust filtering process, as recited in claim 20, wherein said step (d7) further comprise said steps of:
(d7-1) receiving said measurement model from said model selection and computing a predicted measurement at said forward state estimate in a measurement model computation;

(d7-2) receiving said derivative measurement model from said model selection and computing a measurement Jacobian matrix at said forward state estimate in a derivative measurement model computation;

(d7-3) updating said covariance error matrix of said backward system estimate using said backward measurement update equations in a backward estimate covariance update; and (d7-4) updating said backward state estimate by using said backward measurement update equations in a backward estimate update.

25. A universal robust filtering process, as recited in claim 21, wherein said step (d7) further comprise said steps of:

(d7-1) receiving said measurement model from said model selection and computing a predicted measurement at said forward state estimate in a measurement model computation;

(d7-2) receiving said derivative measurement model from said model selection and computing a measurement Jacobian matrix at said forward state estimate in a derivative measurement model computation;

(d7-3) updating said covariance error matrix of said backward system estimate using said backward measurement update equations in a backward estimate covariance update; and (d7-4) updating said backward state estimate by using said backward measurement update equations in a backward estimate update.

26. A universal robust filtering process, as recited in claim 22, wherein said step (d7) further comprise said steps of:

(d7-1) receiving said measurement model from said model selection and computing a predicted measurement at said forward state estimate in a measurement model computation;

(d7-2) receiving said derivative measurement model from said model selection and computing a measurement Jacobian matrix at said forward state estimate in a derivative measurement model computation;

(d7-3) updating said covariance error matrix of said backward system estimate using said backward measurement update equations in a backward estimate covariance update; and (d7-4) updating said backward state estimate by using said backward measurement update equations in a backward estimate update.

27. A universal robust filtering process, as recited in claim 23, wherein said step (d7) further comprise said steps of:

(d7-1) receiving said measurement model from said model selection and computing a predicted measurement at said forward state estimate in a measurement model computation;

(d7-2) receiving said derivative measurement model from said model selection and computing a measurement Jacobian matrix at said forward state estimate in a derivative measurement model computation;

(d7-3) updating said covariance error matrix of said backward system estimate using said backward measurement update equations in a backward estimate covariance update; and (d7-4) updating said backward state estimate by using said backward measurement update equations in a backward estimate update.

28. A universal robust filtering process, as recited in claim 11, 12, 13, 14, 15, 16, 17, 18, 19, 20, 21, 22, 23, 24, 25, 26, or 27, before the step (a), further comprising the steps of:

selecting system state elements to be a square root of abundance of candidate materials, which guarantees nonnegativeness of abundance;

establishing a dynamical system model, by converting a two-dimensional spatial index into a one-dimensional index, and assuming that a relationship of said square root of abundance between two adjacent pixels is modeled as a Gauss-Markov process; and establishing a measurement model, by assuming that a spectrum of each of said pixels is modeled as a linear mixture of spectral signatures of materials within said pixel.

* * * * *